United States Patent
Rodoper et al.

(10) Patent No.: US 11,758,616 B1
(45) Date of Patent: Sep. 12, 2023

(54) MANAGING MESH NETWORK CONNECTIVITY USING SYNCHRONIZED CONNECTION COST METRICS

(71) Applicant: Amazon Technologies, Inc., Seattle, WA (US)

(72) Inventors: Mete Rodoper, Alameda, CA (US); Kyoungchae Oh, Sunnyvale, CA (US); Yogesh Reddy Kondareddy, Milpitas, CA (US); Alexandra Calkins Katague, San Francisco, CA (US); Nikhil Deshpande, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 17/104,310

(22) Filed: Nov. 25, 2020

(51) Int. Cl.
*H04L 12/16* (2006.01)
*H04W 84/18* (2009.01)
*H04W 48/16* (2009.01)
*H04W 48/20* (2009.01)

(52) U.S. Cl.
CPC ........... *H04W 84/18* (2013.01); *H04W 48/16* (2013.01); *H04W 48/20* (2013.01)

(58) Field of Classification Search
CPC ...... H04W 84/18; H04W 48/16; H04W 48/20
USPC .......................................................... 370/238
See application file for complete search history.

(56) References Cited

U.S. PATENT DOCUMENTS

| | | | |
|---|---|---|---|
| 2002/0018449 A1* | 2/2002 | Ricciulli | H04L 45/22 370/268 |
| 2005/0237950 A1* | 10/2005 | Yuan | H04L 45/00 370/255 |
| 2015/0350061 A1* | 12/2015 | Chunduri | H04L 41/0654 370/228 |

* cited by examiner

*Primary Examiner* — Faisal Choudhury
(74) *Attorney, Agent, or Firm* — Lowenstein Sandler LLP

(57) ABSTRACT

A method and system to manage connectivity of a client device in a mesh network including one or more network devices. A first network device determines a first client link cost metric associated with a first connection between the first network device and the client device. The first network device determines a first mesh link cost metric associated with a second connection between the first network device and a destination device. A first total connection cost metric is determined based on the first client link cost metric and the first mesh link cost metric. The first network device identifies a set of total connection cost metrics associated with the one or more network devices and destination device of the network. The first network device executes a connection decision in response to a comparison of the set of total connection cost metrics.

15 Claims, 7 Drawing Sheets

MANAGING MESH NETWORK CONNECTIVITY USING SYNCHRONIZED CONNECTION COST METRICS

BACKGROUND

A mesh network environment may include one or more network devices or nodes providing client devices with connectivity to one or more destination nodes (e.g., a router or gateway device to an upstream connection, a media server, etc.). The nodes of the mesh network may include one or more access point devices that can connect to a client device and provide connectivity to the destination node. The multiple nodes of the mesh network provide respective connections or paths to the destination node that can be selected for a client device. When the client device is roaming, the mesh network identifies the node having a highest relative signal strength (e.g., based on a relative measurement of how well a client device can "hear" a beacon signal from a node) as the "closest" node for establishing the connection.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

DETAILED DESCRIPTION

Figure 1:
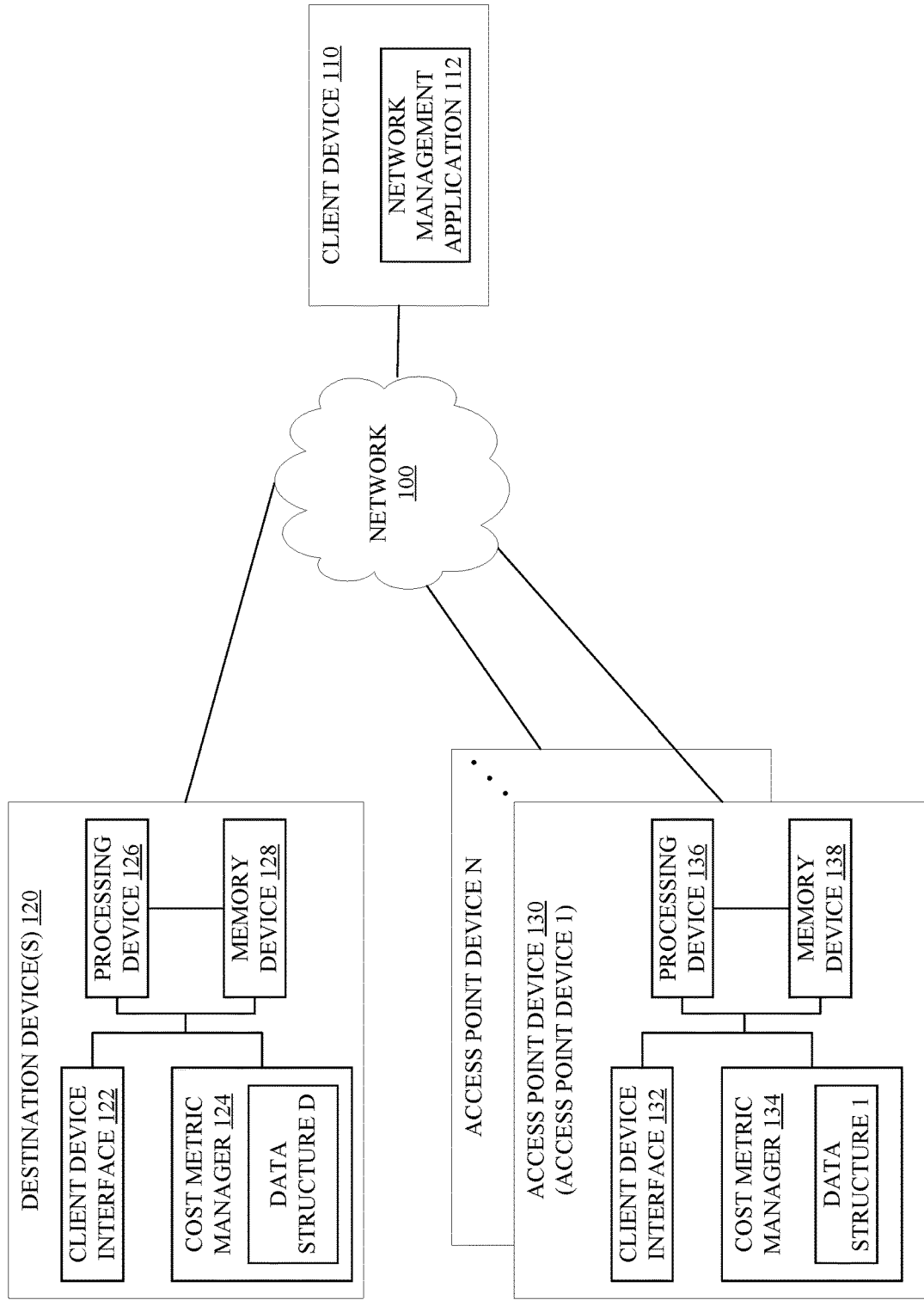
FIG. 1 illustrates an example network including one or more destination devices and one or more access point devices to manage connectivity with a client device using synchronized connection cost metric information, according to one or more embodiments.

The present disclosure relates to a method and system to manage connectivity of one or more client devices in a mesh network including one or more access point devices and one or more destination devices based on synchronized connection cost metrics associated with multiple mesh link routing options. The mesh network includes multiple different routing options or mesh links between respective access point devices (e.g., a wireless device configured to provide an access point to one or more other devices). A mesh link can include a connection between a client device and an access point device (e.g., a network access point or router device) to enable a connection with a destination device (e.g., a router device, a media server, etc.)

Each of the access point devices maintains a data structure (e.g., a table) to store a total cost connection metric associated with connecting the client device (e.g., a mobile phone, tablet, laptop, desktop, etc.) to the destination device. In an embodiment, for each of the access point devices in the mesh network, the total connection cost metric is determined based on a cost metric associated with a connection between the access point device and the client device (also referred to as a "client link cost metric") and a cost metric associated with a connection between the access point device and the destination device (also referred to as a "mesh link cost metric").

The method and system enable each access point device to generate and execute a connection decision based on a comparison of the total connection cost metric associated with each of the respective access point devices. In an embodiment, each access point device is configured to synchronize or share respective total connection cost metrics with one another to enable the execution of the connection decision. Execution of the connection decision can include maintaining an existing connection with the client device, establishing a new connection with the client device, terminating an existing connection with the client device, or taking no connection action (e.g., remaining in an unconnected state with respect to the client device). In an embodiment, based on a comparison of the synchronized total connection cost metrics, the access point device having the lowest or smallest relative total connection cost metric is identified for connection with the client device.

In an embodiment, the client link cost metric is a calculated value representing a level of a connectivity between the client device and an access point device. In an embodiment, the client link cost metric is calculated based on one or more parameters of the connection between an access point device and a client device. In an embodiment, the client link cost metric is value that represents an expected "cost" (e.g., expected transmission time) associated with transmitting a packet over a respective link between the client device and an access point. In an embodiment, the client link cost metric can be determined based on one or more parameters including, but are not limited to, a channel busy-ness level, a bitrate, a packet error rate, a channel utilization level, a channel occupancy metric (e.g., an Airtime Link Metric), an expected throughput or physical layer (PHY) rate, RSSI, etc. In an embodiment, the client link cost metric is a calculated integer value (e.g., 5, 7, 10, 12, 15, etc.). In an embodiment, the mesh link cost metric is a calculated value representing a level of a connectivity between an access point device and a destination device (e.g., a device to which the client device is seeking a connection). In an embodiment, the mesh link cost metric is calculated based on one or more parameters of a connection between an access point device and one or more other access point devices or a destination device. For example, the mesh link cost metric represents a path cost (e.g., expected transmission time) associated with transmitting a packet from an access point device to the destination device, which can include one or more intervening access point devices (e.g., an access point device can connect to the destination device via one or more other access point devices). In an embodiment, the mesh link cost metric can be determined based on one or more parameters including, but are not limited to, a channel busy-ness level, a bitrate, a packet error rate, a channel utilization level, a channel occupancy metric (e.g., an Airtime Link Metric), an expected throughput or physical layer (PHY) rate, RSSI, etc. In an embodiment, the client link cost metric is a calculated integer value (e.g., 5, 7, 10, 12, 15, etc.). In an embodiment, the mesh link cost metric and the client link cost metric can be computed based on the same set of one or more parameters.

In an embodiment, the mesh link cost metric can be calculated based on a set of parameters including channel access overhead ($O_{ch}$) which can include hardware retry time, preamble length, protocol-specific training and signaling fields, etc. In an embodiment, the set of parameters can include a number of bits in a test frame ($B_t$). In an embodiment, the number of bits in the test frame can be a constant value, such as, for example, 8,192 bits.

In an embodiment, the set of parameters can include a data rate average ($R_a$) calculated, for example, using an exponentially weighted moving average (EWMA) in Mbps based on the number of bits in a test frame (Bt) In an embodiment, the set of parameters can include a channel idle average ($I_{ch}$) (e.g., represented as a percentage of idle channels of a total number of channels). In an embodiment, the set of parameters can include a frame error rate per number of $B_t$ ($E_f$).

In an embodiment, the mesh link cost metric can be represented and determined according to the following expression:

$$M_a = \{[O_{ch} + B_t/(R_a * I_{ch})] * [1/(1-E_f)]\}/0.01 TU;$$

where 0.01 TU equals 10.24 microseconds.

In an embodiment, a connection decision process can be initiated for a roaming client device to determine an optimal connection path between the client device and the destination device based on the total connection cost metric. In an embodiment, a calculated first total connection cost metric (e.g., a calculated client link cost metric associated with a connection between a first access point and a calculated first mesh link cost metric associated with a connection between the first access point device and the destination device) can be compared to a calculated second total connection cost metric (e.g., a calculated second client link cost metric associated a connection between the second access point device and the client device and a calculated second mesh link cost metric associated with a connection between the second access point device and the destination device) to determine which access point provides a highest level of connectivity for the connection with the client device (e.g., which access point has a highest relative total connection cost metric value). For example, if the first access point device has a total connection cost metric value of 8 and the second access point device has a total connection cost metric of 6, the system can determine that the connectivity level associated with the first access point is better (e.g., a higher value) and execute a connection decision to connect the client device to the destination device via the first access point device.

In an embodiment, the connection decision process can be initiated by an access point device in response to a connection request from the roaming client device. In an embodiment, the connection decision process can be initiated by an access point device having a current or existing connection with the client device in response to roaming activity to determine if the access point device remains the optimal access point device for the connection based on a comparison of the synchronized total connection cost metrics associated with the multiple network devices (e.g., access point devices and destination device).

According to embodiments, the method and system can advantageously determine, for each access point device, a total connection cost metric representing both the client link cost metric and the mesh link cost metric. Furthermore, the set of devices in the mesh network (e.g., the one or more access point devices and destination device) share or synchronize their respective total connection cost metrics with one another to enable one or more of the network devices to generate and execute a connection decision based on a comparison of the total connection cost metrics. In an embodiment, each of the network devices (e.g., the one or more access point devices and destination device) can maintain a data structure (e.g., table) including the synchronized total connection cost metrics associated with each of the network devices in the mesh network.

As described above, the embodiments described herein overcome problems and challenges with respect to conventional connectivity processing relating to a roaming client device by selecting an optimal mesh network device for connectivity with the client device based on synchronized total connection cost metrics representing both a client link cost metric (e.g., a connection cost between a client device and an access point device) and a mesh link cost metric (e.g., a connection cost between an access point device and a destination device). The embodiments of the present application are directed to a connection cost management system configured to maintain a data structure including the total connection cost metrics for each of the network devices in a mesh network. The connection cost management system can utilize the data structure to identify the respective total connection cost metrics, perform a comparison and generate a connection decision based on the comparison results.

Advantageously, the embodiments of the present disclosure determines and assigns link metrics for each link within the network (e.g., mesh links between nodes of the network and client links and nodes of the network). This provides advantages over conventional networks that based the connection decision based on only a received signal strength indicator (RSSI) value associated with the node to client device link.

FIG. 1 illustrates an example network 100 including one or more destination devices 120 and one or more access point devices 130 (e.g., Access Point Device 1 . . . Access Point Device N). In an embodiment, the one or more destination devices 120 can include a router device or gateway device coupled to an upstream network or system. In an embodiment, the one or more destination devices 120 can include a computing system, such as a media server. In an embodiment, the network 100 is configured to enable one or more client devices 110 to connect to the destination device 120. In an embodiment, the connection between the client device 110 and the destination device 120 can be established directly or via one or more of the access point devices 130, according to embodiments of the present application.

According to embodiments, the client device 110 can a mobile device, a mobile device, a personal digital assistant (PDA), a portable media player, a tablet computer, a desktop computer, a laptop computer, a netbook, an electronic reader device, a media streaming device, and the like configured to connect to the mesh network 100. According to embodiments of the present invention, the client device 110 can include a network management application 112 configured to manage operations and functions relating to the connectivity of the client device 110. For example, the network management application 112 can be a program or set of instructions configured to enable communications (e.g., connection requests, address information, location information, etc.) relating to the establishment of a connection between the client device 110 and the destination device 120 via the network 100.

In an embodiment, the one or more access point devices 130 can include a client device interface 132 and a cost metric manager 134. The client device interface 132 is configured to communicate with the client device 110 to perform operations relating to the connection of the client device 110 to the network 100. In an embodiment, the client device interface 132 can receive a connection request from a client device, perform operations relating to an existing or current connection with the client device 110, transmit a signal (e.g., a beacon signal) to the client device 110 to collect information relating to the client device 110, etc.

In an embodiment, the cost metric manager 134 of the access point device 130 performs operations relating to the management of the cost metrics associated with the one or more access point devices 130 of the network 100. In an embodiment, the cost metric manager 134 collects cost metrics from one or more other network devices (e.g., the other access point devices and the destination device 120). In an embodiment, the multiple network devices (e.g., access point devices 130 and destination device 120) synchronize or share the respective cost metrics (e.g., a total connection cost metric) with one another via one more communications managed by the cost metric manager 134. In an embodiment, the cost metric manager 134 maintains a data structure (e.g., Data Structure 1 of Access Point Device 1) including the cost metrics associated with each of the network devices of the network 100. In an embodiment, the data structure is updated (e.g., on a periodic basis, in response to a connection request, in response to a roaming action by the client device, etc.) to include current or updated cost metrics associated with the network 130.

In an embodiment, the access point device 130 includes a processing device 136 and a memory 138. The memory 138 may be any suitable memory or data storage location, including a non-transitory computer readable storage medium, such as, but not limited to, any type of database, disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

In an embodiment, the destination device 120 includes a client device interface 122 and a cost metric manager 124, as described above with reference to the access point devices 130. Like the cost metric manager 134 of the access point device 130, the cost metric manager 124 of the destination device 120 can maintain a data structure (e.g., Data Structure D) including the synchronized total connection cost metrics associated with connecting the client device 110 to the destination device 120, as described below in greater detail with reference to FIGS. 2-6.

In an embodiment, the destination device 120 can be a router device configured for direct connection with the client device 110. For example, the client device 110 may request a connection to the router device (e.g., destination device 120) for communication via an upstream network (e.g., the Internet). In this example, the client device 110 may connect directly to the destination device 120 via a client link or connect to the destination device 120 via a client link with an access point device 130 which can in turn connect to the destination device 120 via one or more mesh links, as shown in greater detail with respect to FIGS. 3 and 4.

In an embodiment, the destination device 120 includes a processing device 126 and a memory 128. The memory 128 may be any suitable memory or data storage location, including a non-transitory computer readable storage medium, such as, but not limited to, any type of database, disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

According to embodiments, as shown and described below in greater detail with reference to FIGS. 2-7, the cost metric manager of each network device (e.g., cost metric manager 124 of destination device 120 and cost metric manager 132 of each of the one or more access point devices 130) synchronizes total connection cost metrics with the network devices of the network 100, maintains a data structure including the set of total connection cost metrics for each of the respective paths to the destination device 120, and executes a connection decision based on a comparison of the synchronized total connection cost metrics.

In an embodiment, the data stored in the respective data structures can be selectively synchronized between the nodes. In an embodiment, a selected set of nodes (e.g., access devices, destination devices) may execute a synchronization operation to share a respective data structure with the other nodes in the selected set in connection with a roaming decision. In this example, each node of the selected set may send their updated connection cost metric data to less than the entire set of nodes in the mesh network. Furthermore, in this embodiment, a node of the mesh network may not participate in a synchronization event and may not send or receive updated connection cost data.

In an embodiment, a selective synchronization may be executed in response to determining that one or more nodes are currently executing another task having a high workload level or have been reserved for other purposes (e.g., the one or more nodes are engaged in or dedicated to processing one or more other tasks such as image/audio processing, machine learning algorithm execution, etc.) and are not selected for a particular synchronization event. In this example, the one or more nodes that are reserved for other purposes are not included in the selected set of nodes and do not receive or send updated connect cost data. In an embodiment, a current workload level of an access point can be determined and compared to a threshold workload level. In an embodiment, if the current workload level exceeds the threshold workload level, the access point can be opted-out or excluded from a set of nodes that synchronize respective connection cost data as part of a roaming decision action.

For example, a camera device can offload its image processing to an access point to which it is connected. In this example, the access point may be dedicated to the image processing take and, as a result, the access point can be excluded from a roaming connection event associated with another device. Accordingly, for the roaming connection decision associated with the other device, a selected set of nodes (excluding the access point connected to the camera) can synchronize respective connection cost data with one another to determine an optimal path for connecting the other device to a desired destination device in accordance with the methods and systems described herein.

In an embodiment, for the set of participating nodes, the data structure synchronization can be executed on a periodic basis (e.g., every 5 seconds). In an embodiment, the data structure synchronization can be initiated in response to one or more triggering events. Example triggering events include, but are not limited to, an RSSI value of a client device's existing connection to a node falls below a threshold RSSI value, a location or position of the client device (e.g., a mobile phone in a user's pocket) changes in a manner that satisfies a position-based condition, etc. In response to a triggering event, the nodes can initiate the exchange of the data structure information to enable the evaluation of the total connection cost metrics and the execution of a connection decision.

In an embodiment, the synchronization event (e.g., the one or more communications relating to the sending and receiving updated data structure information) can be a unicast or broadcast communication among the nodes. In an embodiment, the synchronization event could be a distributed database model, where all nodes synchronize the full database automatically.

Figure 2:
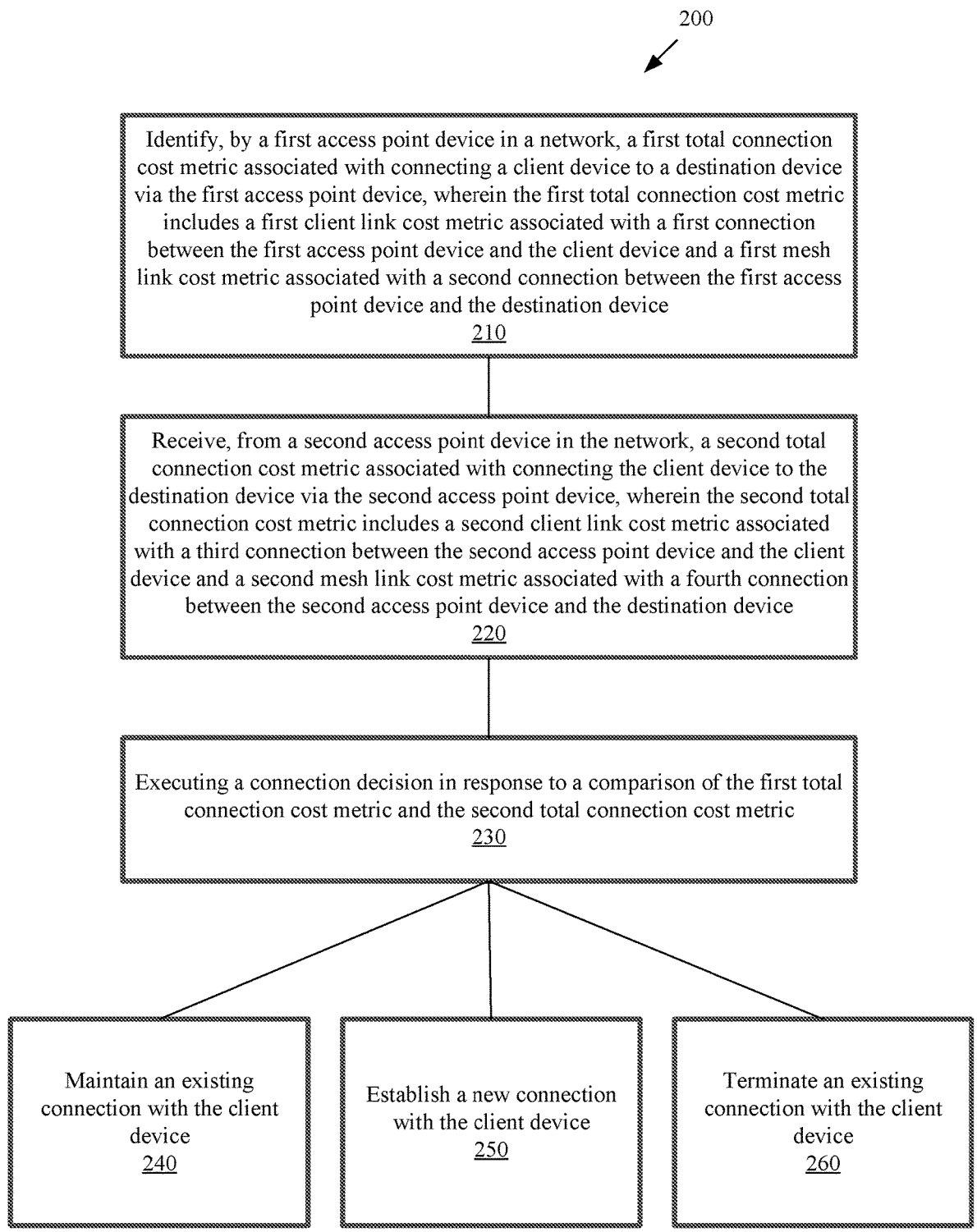
FIG. 2 is an exemplary flow diagram of a method for managing connectivity of a client device to a destination device in a mesh network environment including one or more access point devices, according to one or more embodiments.

FIG. 2 is an exemplary flow diagram of one embodiment of a method 200 for managing connectivity of a client device to a destination device in a mesh network environment including one or more access point devices, according to embodiments of the present disclosure. It is understood that the flowchart of FIG. 2 provides an example of the many different types of functional arrangements that may be employed to implement the operation of a cost metric manager of an access point device or a destination device as described herein. The method 200 of FIG. 2 may be performed by processing logic of a cost metric manager (e.g., cost metric manager 124 of the destination device 120 or cost metric manager 134 of access point device 130 of FIG. 1) that comprises hardware (e.g., circuitry, dedicated logic, programmable logic, microcode, etc.), software (e.g., instructions run on a processing device to perform hardware simulation), or a combination thereof. Although the processing logic performing the operation of method 200 may be part of each of the one or more access point devices and a destination device (e.g., where the destination device is a gateway device such as router), for illustrative purposes, the operations described below are described from the perspective of a first access point device in a mesh network including multiple access point devices and a destination device. The operations of method 200 may be performed in any order so as to fit the needs of the functionality to be provided.

In block 210, the processing logic identifies a first total connection cost metric associated with connecting a client device to a destination device via the first access point device, wherein the first total connection cost metric includes a first client link cost metric associated with a first connection between the first access point device and the client device and a first mesh link cost metric associated with a second connection between the first access point device and the destination device.

In an embodiment, the first client link cost metric is a measurement of one or more parameters associated with a connection between the first access point device and the client device. In an embodiment, the first mesh link cost metric is a measurement of the one or more parameters associated with connecting the first access point device to the destination device. In an example, this connection can include one or more hops or connections, such as a connection from the first access point device to one or more other access point devices which complete the connection to the destination device. In another example, the first mesh link cost metric can represent a cost of a direct connection between the first access point device and the destination device (e.g., without any intervening access point devices). In an embodiment, the first total connection cost metric represents a calculated cost associated with connecting the client device to the destination device via the first access point device (e.g., a connection path from the client device to the access point device to the destination device).

At block 210, the processing device of the first access point device receives, from a second access point device in the network, a second total connection cost metric associated with connecting the client device to the destination device via the second access point device, wherein the second total connection cost metric includes a second client link cost metric associated with a third connection between the second access point device and the client device and a second mesh link cost metric associated with a fourth connection between the second access point device and the destination device.

In an embodiment, the second total connection cost metric is shared or synchronized by the second access point device to the first access point device. The synchronization of the total connection cost metrics by the access point devices in the network can be performed on a periodic basis or in response to an initiation by the client device or an access point device. For example, a client device may engage in roaming activity (e.g., a mobile device that is moving from one room with the network to another room with the network). In view of the roaming activity, the client device can send a communication to an access point device to which it is currently connected (e.g., the first access point device or the second access point device) which can trigger the determination and synchronization of the total connection cost metrics among the multiple network devices (e.g., the multiple access point devices and, in some cases, the destination device). In an embodiment, an access point device that is currently connected to the client device can initiate the synchronization of the total connection cost metrics by transmitting a communication to the one or more other network devices in the network.

At block 230, the processing logic executes a connection decision in response to a comparison of the first total connection cost metric and the second total connection cost metric. In an embodiment, the comparison involves a determination whether the first total connection cost metric has a lower value or a higher value than the second total connection cost metric. In an embodiment, the comparison of the first total connection cost metric (e.g., the cost to connect the client device to the destination device via the first access point device) and the second total connection cost metric (e.g., the cost to connect the client device to the destination device via the second access point device) is used to determine an optimal or most cost-efficient path for the desired connection.

In an embodiment, if the first access point device has a current or existing connection to the client device and the first total connection cost metric is less than or equal to the second total connection cost metric, execution of the connection decision includes maintaining the existing connection with the client device, at block 240. Maintaining the existing connection with the client device enables the first access point device to further maintain the connection between the client device and the destination device.

In an embodiment, if the first access point device does not have a current or existing connection to the client device and the first total connection cost metric is less than the second total connection cost metric, execution of the connection decision includes establishing a new connection with the client device, at block 250. In an embodiment, establishing the new connection with the client device further enables the first access point device to complete the connection between the client device and the destination device.

In an embodiment, if the first access point device has a current or existing connection to the client device and the first total connection cost metric is greater than the second total connection cost metric, execution of the connection decision includes terminating the existing connection with the client device, at block 260. In this embodiment, since the path via the second access point device represents a lower total connection cost for the connection between the client device and the destination device, the first access point device terminates its exiting connection to the client device to enable the second access point device to establish a connection with the client device.

Figure 3:
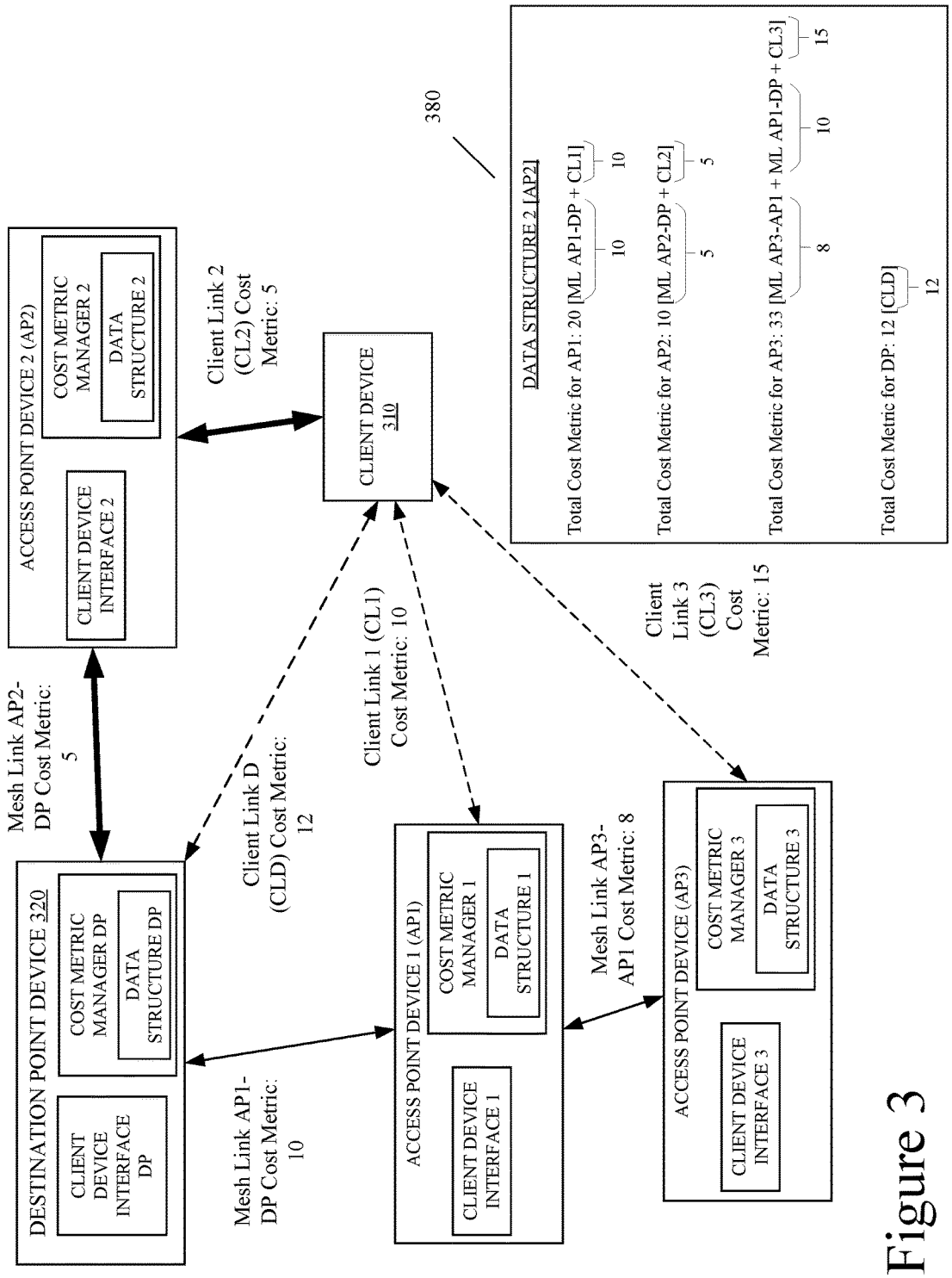
FIGS. 3 and 4 illustrate an example mesh network environment over a period of time during which connectivity of a client device to a destination point is managed, according to one or more embodiments.
Figure 4:
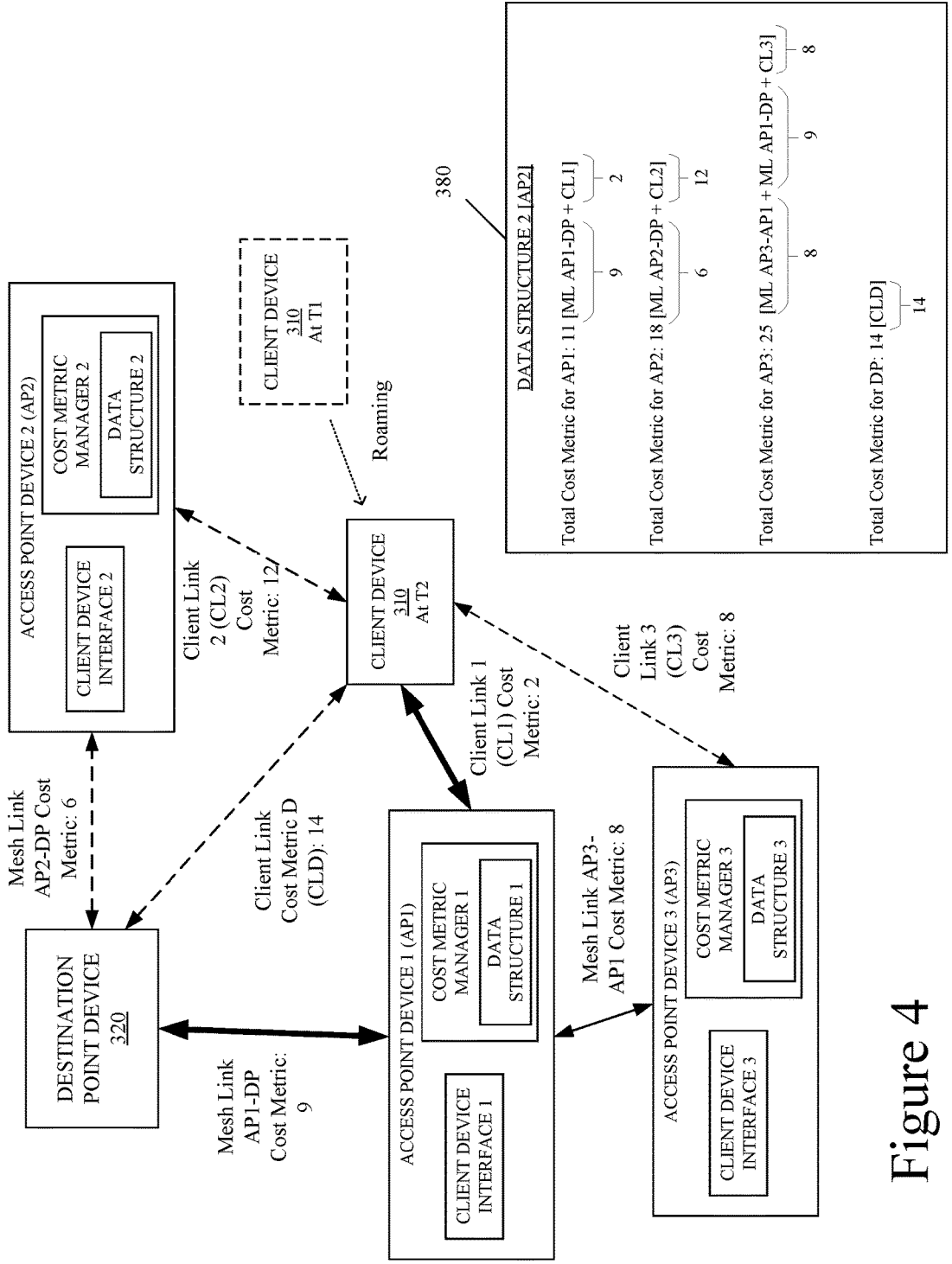

FIGS. 3 and 4 illustrate an example mesh network environment over a period of time during which connectivity of a client device 310 to a destination point 320 is managed. FIG. 3 illustrates the network environment at Time 1 (T1) where the client device 310 is connected via client link 2 (CL2) to Access Point Device 2 (AP2) which is connected to the destination point (DP) 320 via mesh link AP2-DP. FIG. 3 includes a data structure 380 of AP2 that includes synchronized total cost metrics associated with the various nodes to enable a decision for routing one or more packets between the client device 310 and the destination point 320.

As shown in FIGS. 3 and 4, the mesh network includes the following mesh links: mesh link API-DP (i.e., the mesh link connecting Access Point Device 1 and the Destination Point Device 320); mesh link AP2-DP (i.e., the mesh link connecting Access Point Device 2 and the Destination Point Device 320); and mesh link AP3-AP1 (i.e., the mesh link connecting Access Point Device 3 and Access Point Device 1). In addition, as shown in FIGS. 3 and 4, the mesh network includes the following client links: client link 1 (CL1) (i.e., the client link connecting the Client Device 310 to Access Point Device 1); client link 2 (CL2) (i.e., the client link connecting the Client Device 310 to Access Point Device 2); client link 3 (CL3) (i.e., the client link connecting the Client Device 310 to Access Point Device 3); and client link D (CLD) (i.e., the client link connecting the Client Device 310 to the Destination Point Device 320).

As shown in FIG. 3, the respective mesh link cost metrics and client link cost metrics are identified by AP2 to generate a connection decision at T1. In this example, the mesh link AP1-DP cost metric has a value of 10, the mesh link AP2-DP cost metric has a value of 5, the mesh link AP3-API cost metric has a value of 8, the CL1 cost metric has a value of 10, the CL2 cost metric has a value of 5, the CL3 cost metric has a value of 13 and the CLD cost metric has a value of 12.

In an embodiment, the aforementioned link cost metrics are synchronized by respective cost metric managers for the maintaining of a data structure storing the shared cost metric information. As shown in FIG. 3, data structure 2 (of AP2) includes the synchronized cost metric information associated with AP1, AP2, AP3 and the Destination Point Device 320. As shown, a total cost metric is generated for each of the nodes of the network by adding the associated client link cost metric and the one or more mesh link cost metrics. As shown in Data Structure 2 380 of AP2, the total cost metric for AP1 is 20 (the ML AP1-DP cost metric of 10 plus the CL1 cost metric of 10); the total cost metric for AP2 is 10 (the ML AP2-DP cost metric of 5 plus the CL2 cost metric of 5); the total cost metric for AP3 is 33 (the ML AP3-AP1 cost metric of 8 plus the ML AP1-DP cost metric of 10 plus the CL3 cost metric of 15); and the total cost metric for a direct connection to the Destination Point 320 is 12 (the CLD cost metric of 12).

In an embodiment, as shown in FIG. 3, AP2 has the lowest relative total connection cost metric value (i.e., 10) based on a comparison of all of the aforementioned total connection cost metric values. Accordingly, a connection is established (or maintained) between the Client Device 310 and AP2 to enable connectivity between the Client Device 310 and the Destination Point 320, as illustrated by the bolded lines in FIG. 3.

FIG. 4 illustrates the mesh network at T2, where the client device 310 is roaming from a first location to a second location. As shown in FIG. 4, the respective updated mesh link cost metrics and client link cost metrics are identified by AP2 to generate a connection decision at T2. In this example, the mesh link AP1-DP cost metric has an updated value of 9, the mesh link AP2-DP cost metric has a value of 6, the mesh link AP3-API cost metric has a value of 8, the CL1 cost metric has a value of 2, the CL2 cost metric has a value of 12, the CL3 cost metric has a value of 26 and the CLD cost metric has a value of 14.

In an embodiment, the aforementioned link cost metrics are synchronized by respective cost metric managers for the maintaining of a data structure storing the shared cost metric information. As shown in FIG. 4, data structure 2 (of AP2) includes the synchronized cost metric information associated with AP1, AP2, AP3 and the Destination Point 320. As shown, a total cost metric is generated for each of the nodes of the network by adding the associated client link cost metric and the one or more mesh link cost metrics. As shown in Data Structure 2 380 of AP2, the total cost metric for AP1 is 11 (the ML AP1-DP cost metric of 9 plus the CL1 cost metric of 2); the total cost metric for AP2 is 18 (the ML AP2-DP cost metric of 6 plus the CL2 cost metric of 12); the total cost metric for AP3 is 25 (the ML AP3-AP1 cost metric of 8 plus the ML AP1-DP cost metric of 9 plus the CL3 cost metric of 8); and the total cost metric for a direct connection to the Destination Point 320 is 14 (the CLD cost metric of 14).

In this example, as shown in FIG. 4, AP1 has the lowest relative total connection cost metric value (i.e., 11) based on a comparison of all of the aforementioned total connection cost metric values. Accordingly, AP2 terminates the connection with the Client Device 310 and AP1 establishes a connection with the Client Device 310 to enable connectivity between the Client Device 310 and the Destination Point 320, as illustrated by the bolded lines in FIG. 4.

Figure 5:
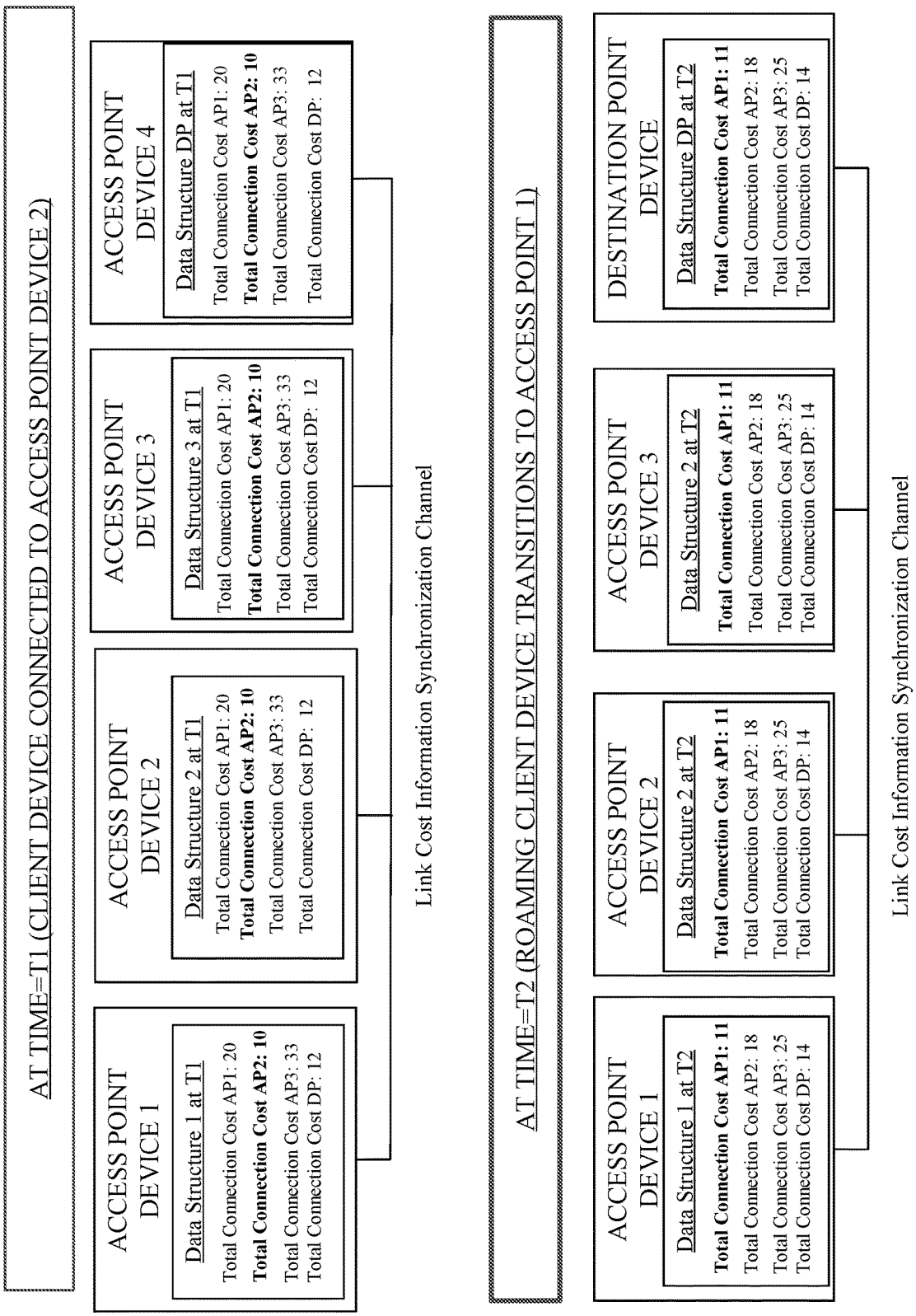
FIG. 5 illustrates data structures of respective nodes of a mesh network including synchronized connection cost metric information, according to one or more embodiments.

FIG. 5 illustrates respective data structures of the nodes of the network at T1 and T2 of the examples shown in FIGS. 3 and 4. As shown, each node (e.g., AP1, AP2, AP3, and DP) of the mesh network maintains a data structure including the respective total connection cost metric values for the respective nodes within the network. As shown, at T1, the data structures store the link cost information (e.g., the total connection cost metrics) that is synchronized among the nodes (e.g., via a link cost information synchronization channel). In the example shown, at T1, the node having the lowest relative total connection cost is AP2. Accordingly, a connection is established between the client device and AP2 at T1.

In an embodiment, as shown in FIG. 5, at T2, the data structures of the set of nodes in the network are updated with synchronized connection cost information based on the roaming activity of the client device. In the example shown, at T2, the node having the lowest relative total connection cost is AP1. Accordingly, a connection is established between the client device and AP1 at T1.

Figure 6:
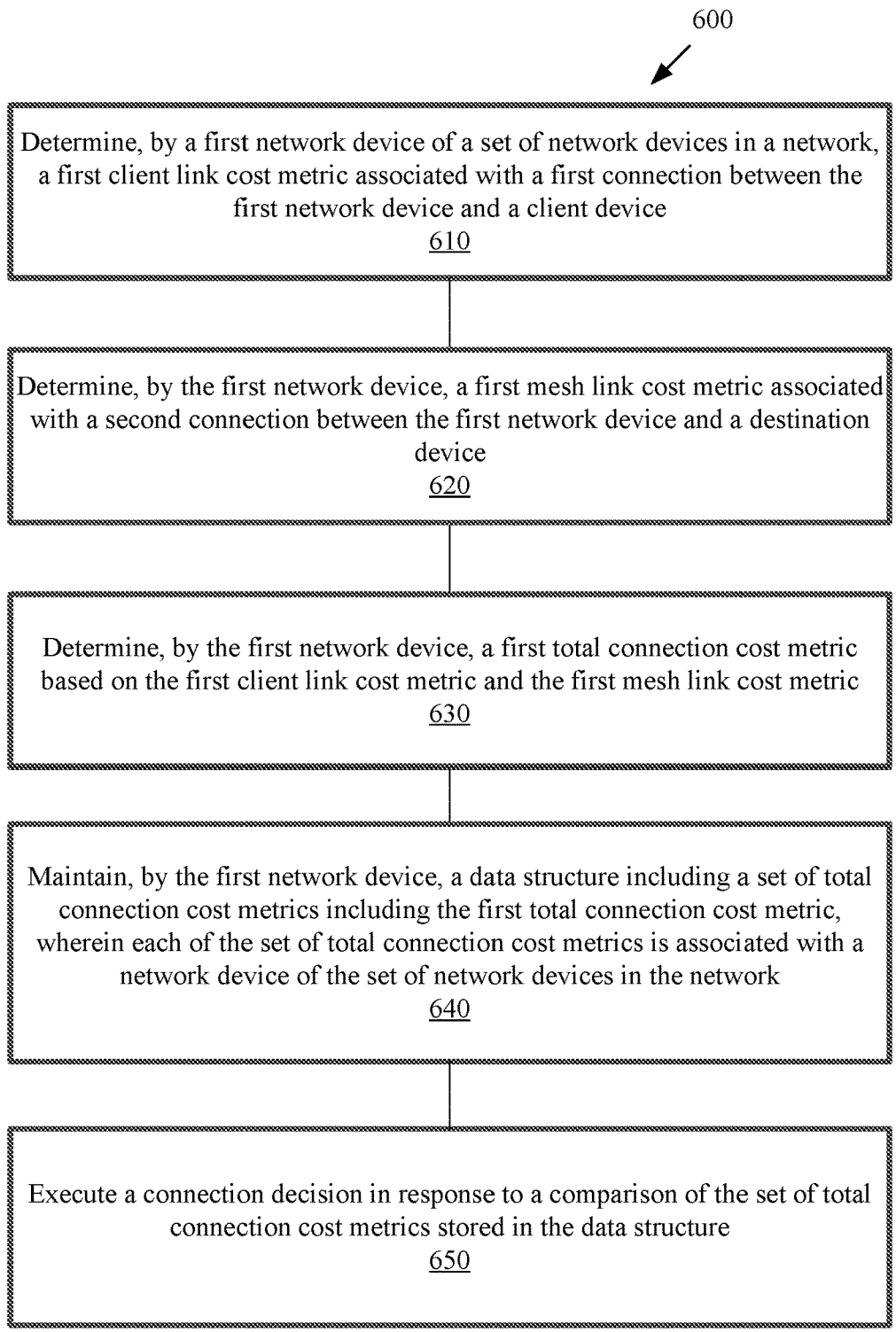
FIG. 6 is an exemplary flow diagram of a method for managing connectivity of a client device to a destination device in a mesh network environment including one or more access point devices using synchronized connection cost metrics stored in one or more data structures, according to one or more embodiments.

FIG. 6 is an exemplary flow diagram of one embodiment of a method 600 for managing connectivity of a client device to a destination device in a mesh network environment including one or more access point devices using synchronized connection cost metrics stored in a data structure, according to embodiments of the present disclosure. It is understood that the flowchart of FIG. 6 provides an example of the many different types of functional arrangements that may be employed to implement the operation of a cost metric manager of an access point or a destination device as described herein. The method 600 of FIG. 6 may be performed by processing logic of a cost metric manager (e.g., cost metric manager 124 of the destination device 120 or cost metric manager 134 of access point 130 of FIG. 1) that comprises hardware (e.g., circuitry, dedicated logic, programmable logic, microcode, etc.), software (e.g., instructions run on a processing device to perform hardware simulation), or a combination thereof. Although the processing logic performing the operation of method 600 may be part of each of the one or more access point devices and a destination device (e.g., where the destination device is a gateway device such as router), for illustrative purposes, the operations described below are described from the perspective of a first access point in a mesh network including multiple access point devices and a destination device. The operations of method 600 may be performed in any order so as to fit the needs of the functionality to be provided.

At block 610, the processing logic of a first network device of a set of network devices in a network determines a first client link cost metric associated with a first connection between the first network device and a client device. At block 620, the processing logic determines a first mesh link cost metric associated with a second connection between the first network device and a destination device. At block 630, the processing logic determines a first total connection cost metric based on the first client link cost metric and the first mesh link cost metric.

At block 640, the processing logic maintains a data structure including a set of total connection cost metrics including the first total connection cost metric, wherein each of the set of total connection cost metrics is associated with a network device of the set of network devices in the network.

At block 650, the processing logic executes a connection decision in response to a comparison of the set of total connection cost metrics stored in the data structure. In an embodiment, the connection decision is generated by performing a look-up operation using the data structure to determine the updated or current total connection cost metrics for the set of network devices and performing a comparison operation using the looked-up connection cost metric values. In an embodiment, the data structure can be updated periodically or in response to an action or command with synchronized cost metric information relating to the set of network devices as it relates to a client device within the network. In an embodiment, execution of the connection decision includes connecting to the client device if the total connection cost metric of the first network device has the lowest or smallest relative value. In an embodiment, execution of the connection decision includes disconnecting or terminating an existing connection with the client device if the total connection cost metric of the first network device is larger than one or more of the other total connection cost metrics stored in data structure.

Figure 7:
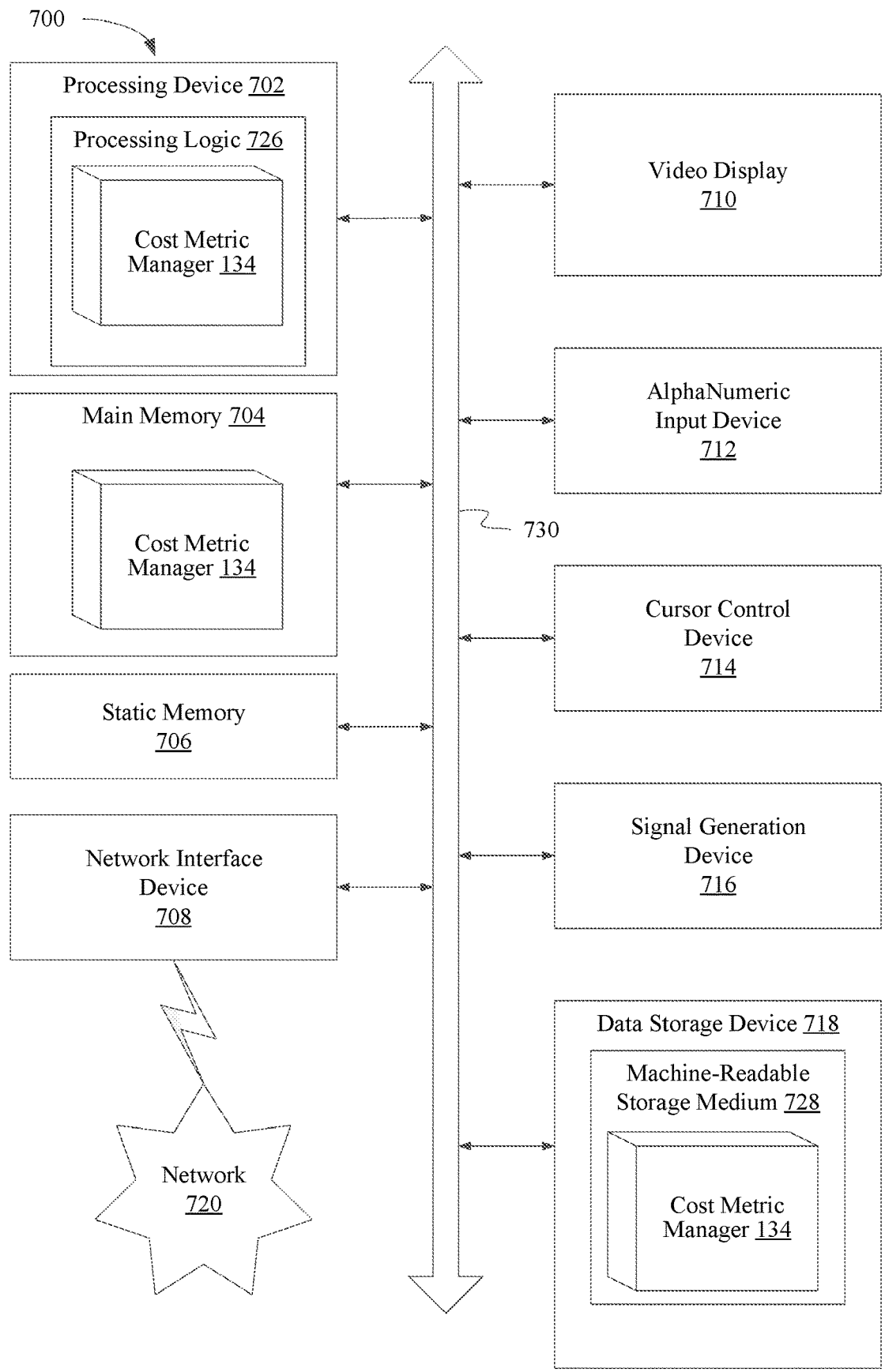
FIG. 7 illustrates a diagrammatic representation of a machine in the example form of a computer system including a set of instructions executable by a computer to manage connectivity of a client device in a mesh network, according to one or more embodiments.

FIG. 7 illustrates a diagrammatic representation of a machine in the example form of a computer system 700 including a set of instructions executable by a computer to manage connectivity of a client device in a mesh network based on synchronized connection cost metrics associated multiple connection paths according to any one or more of the methodologies discussed herein. In one embodiment, the computer may include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 700 includes a processing device (processor) 1202, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. In various implementations of the present disclosure, the processing device 702 is configured to execute instructions for the electronic publication navigation management system 102 for performing the operations and processes described herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable storage medium 728 (or machine-readable medium) on which is stored one or more sets of instructions of the cost metric manager 134 embodying any one or more of the methodologies or functions described herein. The instructions may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 720 via the network interface device 708. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as :detecting", "identifying", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
a set of network devices forming a network, the set of network devices comprising a first device and a second device, the second device comprising:
a processing device; and
a memory to store computer-executable instructions that, if executed, cause the processing device to perform operations comprising:
determining a first cost metric associated with a first connection between the second device and a third device;
determining a second cost metric associated with a second connection between the second device and the first device;
determining, by the second device, a first total connection cost metric based on the first cost metric and the second cost metric, wherein the first total connection cost metric is associated with connecting the first device to the third device via the second device;
determining a second total connection cost metric associated with connecting the first device to the third device via a fourth device;
determining a first condition is satisfied wherein the first total connection cost metric is higher than the second total connection cost metric; and determining a first condition is satisfied wherein the first total connection cost metric is higher than at least one of one or more other total connection cost metrics; and terminating, by the second device, an existing connection with the third device in response to satisfying the first condition.

2. The system of claim 1, wherein each of the set of network devices communicates a respective total connection cost metric to each network device of the set of network devices.

3. The system of claim 1, the operations further comprising:
receiving, by the second device, a connection request from the third device; and
establishing, by the second device, the existing connection between the first device and the third device via the second device.

4. The system of claim 1, the operations further comprising:
receiving data from the fourth device of the set of network devices, wherein the data comprises the second total connection cost metric associated with the fourth device; and
storing the second total connection cost metric in the memory.

5. The system of claim 1, the operations further comprising:
sending data comprising the first total connection cost metric to a first subset of the network devices.

6. The system of claim 1, the operations further comprising:
sending first data to a subset of the set of network devices, the first data comprising the first total connection cost metric; and
receiving second data from the fourth device of the set of network devices, the second data comprising the second total connection cost metric associated with the fourth device.

7. The system of claim 6, wherein the second total connection cost metric comprises:
a third cost metric associated with a third connection between the fourth device and the third device; and
a fourth cost metric associated with a fourth connection between the fourth device and the first device.

8. A network device of a set of network devices in a network, the network device comprising:
a processing device; and
a memory to store computer-executable instructions that, if executed, cause the processing device to perform operations comprising:
determining a first cost metric associated with a first connection between the network device and a client device in a network;
determining a second cost metric associated with a second connection between the network device and a destination device in the network;
determining a first total connection cost metric based on the first cost metric and the second cost metric, wherein the first total connection cost metric is associated with connecting the client device to the destination device via the network device;

determining a second total connection cost metric associated with connecting the client device to the destination device via another network device;
determining a first condition is satisfied wherein the first total connection cost metric is higher than the second total connection cost metric; and
terminating, by the network device, an existing connection with the destination device in response to satisfying the first condition.

9. The network device of claim 8, wherein each of the set of network devices communicates a respective total connection cost metric to each of the set of network devices.

10. The network device of claim 8, the operations further comprising:
receiving, by the network device, a connection request from the client device; and
establishing the existing connection between the client device and the destination device via the network device.

11. The network device of claim 8, the operations further comprising:
receiving data from the another network device of the set of network devices, wherein the data comprises an updated total connection cost metric associated with the another network device; and
storing the updated total connection cost metric in the memory.

12. The network device of claim 8, the operations further comprising:
sending data comprising the first total connection cost metric to a first subset of the set of network devices.

13. A method comprising:
determining a first cost metric associated with a first connection between a first network device and a client device in a network comprising a set of network devices;
determining a second cost metric associated with a second connection between the first network device and a destination device in the network;
determining, by the network device, a first total connection cost metric based on the first cost metric and the second cost metric, wherein the first total connection cost metric is associated with connecting the client device to the destination device via the first network device;
determining a second total connection cost metric associated with connecting the client device to the destination device via a second network device;
determining a first condition is satisfied wherein the first total connection cost metric is higher than the second total connection cost metric; and
terminating, by the first network device, an existing connection with the destination device in response to satisfying the first condition.

14. The method of claim 13, wherein each of the set of network devices communicates a respective total connection cost metric to each of the set of network devices.

15. The method of claim 13, further comprising:
receiving, by the first network device, a connection request from the client device; and
establishing the existing connection between the client device and the destination device via the first network device.

* * * * *